United States Patent [19]

Ban

[11] 4,095,683
[45] Jun. 20, 1978

[54] DIAPHRAGM SPRING CLUTCH

[75] Inventor: Hiroshi Ban, Toyota, Japan

[73] Assignee: Aisin Seiki Kabushiki Kaisha, Kariya, Japan

[21] Appl. No.: 681,669

[22] Filed: Apr. 29, 1976

[30] Foreign Application Priority Data

May 14, 1975 Japan ............................ 50/64559[U]

[51] Int. Cl.$^2$ ............................................ F16D 13/44
[52] U.S. Cl. ............................ 192/70.18; 192/89 B; 192/109 A
[58] Field of Search ............... 192/89 B, 109 A, 70.18

[56] References Cited

U.S. PATENT DOCUMENTS

| 2,085,167 | 6/1937 | Nutt | 192/70.18 X |
| 2,089,472 | 8/1937 | Geyer | 192/89 B |
| 2,117,527 | 5/1939 | Wemp | 192/89 B |
| 2,406,543 | 8/1946 | Hunter | 192/89 B |
| 3,323,624 | 6/1967 | Maurice | 192/89 B |

FOREIGN PATENT DOCUMENTS

| 2,029,334 | 12/1971 | Germany | 192/89 B |
| 319,072 | 2/1934 | Italy | 192/70.18 |
| 943,039 | 11/1963 | United Kingdom | 192/89 B |

Primary Examiner—Irwin C. Cohen
Attorney, Agent, or Firm—Sughrue, Rothwell, Mion, Zinn and Macpeak

[57] ABSTRACT

The axially movable pressure plate for a disc clutch is comprised of an annular main pressure plate and an annular auxiliary pressure plate connected to each other by a plurality of radially disposed plate springs disposed intermediate the main plate and the auxiliary plate and having a wavy cross-sectional configuration in the circumferential direction tending to separate the main plate and auxiliary plate from each other and provide a cushioning effect when the composite pressure plate is shifted into engagement with the clutch disc. Additional plate springs having a similar wavy cross-section in the circumferential direction may be connected only to the auxiliary pressure plate intermediate the plate springs which interconnect the main pressure plate and the auxiliary pressure plate.

3 Claims, 7 Drawing Figures

DIAPHRAGM SPRING CLUTCH

BACKGROUND OF THE INVENTION

1. Field of the Invention

The present invention is directed to a diaphragm spring clutch and more specifically to a two-part pressure plate having spring means interconnecting the parts thereof.

2. Prior Art

It is well known in conventional clutches to construct the clutch disc in such a manner as to achieve gradual clutching, to prevent the generation of vibrations and to obtain smooth engagement. The friction faces of such a clutch disc may be mounted on the disc by means of axially flexible disc springs. Another type of prior disc clutch achieves a similar cushioning effect through the pressure plate rather than the clutch disc. According to this type of clutch the pressure plate is comprised of two plates arranged parallel to each other and to the clutch disc. The two plates are interconnected so as to be axially movable with respect to each other by means of slidable guides provided therebetween and connecting means which limit the movable range. Resilient spring means are provided to move the plates apart from each other and to also impart the desired cushioning effect. However, according to a clutch construction of this type a high degree of accuracy in the manufacturing and assembling of the clutch is required in order for the plates to move smoothly in the axial direction relative to each other on the guide means. Furthermore, sliding resistance is frequently increased due to the accumulation of foreign materials such a the worn powder from the clutch facings on the sliding surfaces of the guide means. Also, the plate located furthest from the clutch disc may not be uniformly retracted due to an irregular operating force of the release lever when the plate does not move smoothly because of a possible disengagement of the plates from the sliding surfaces of the guide means. As a result the cushioning effect is adversely affected resulting in the generation of shock or abnormal vibrations due to sudden torque transmission. Finally, it is difficult to arrange the two plates in coaxial relationship with respect to the rotatable shaft.

SUMMARY OF THE INVENTION

The clutch according to the present invention provides a cushioned clutch construction which is simple, reliable and which overcomes all of the foregoing drawbacks associated with prior art clutch constructions.

The clutch according to the present invention utilizes a two-part pressure plate having radially disposed plate springs disposed between the interconnecting the two parts of the pressure plate. The plate springs have a wavy cross-section in the circumferential direction which normally tends to separate the two parts of the pressure plate and which imparts the desired cushioning effect during clutch engagement. A plurality of retracting springs and supporting straps are secured to the main part of the pressure plate by the same means which connects the plate springs to the main part of the pressure plate. The periphery of an annular diaphragm spring is operatively disposed between the retracting springs and the auxiliary part of the pressure plate for shifting the composite pressure plate into and out of engagement with the clutch disc. Additional plate springs having a wavy cross-section in the circumferential direction are disposed between the two parts of the pressure plate and are connected only to the auxiliary part of the pressure plate intermediate the plate springs which interconnect the two parts of the pressure plate.

The foregoing and other objects, features and advantages of the invention will be apparent from the following more particular description of a preferred embodiment of the invention as illustated in the accompanying drawings.

DETAILED DESCRIPTION OF THE PREFERRED EMBODIMENT

Figure 1:
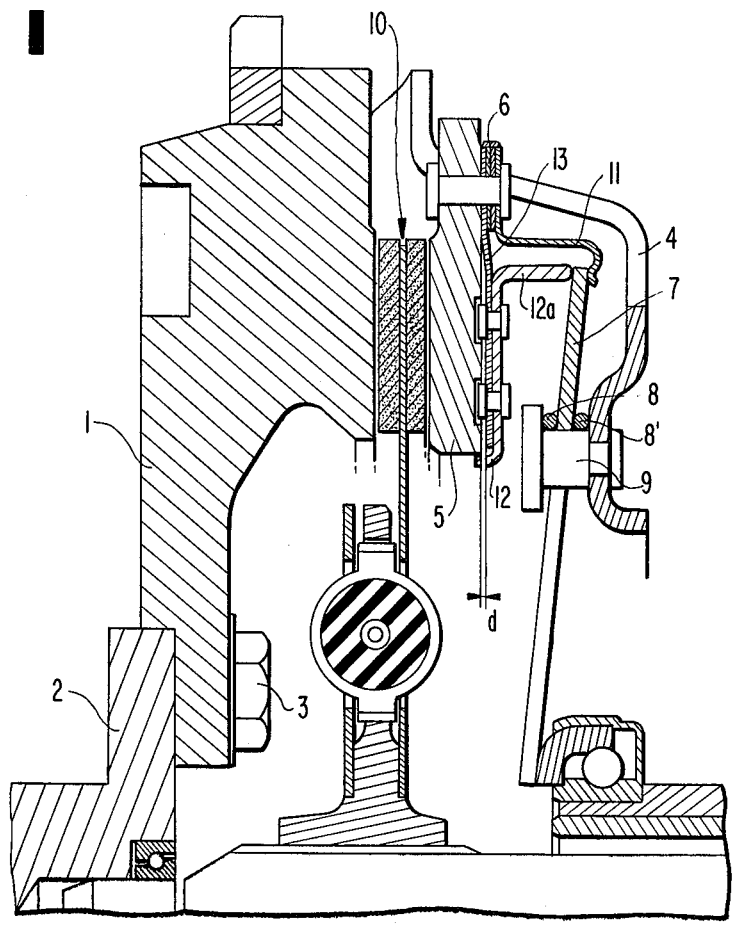
FIG. 1 is a partial sectional view of the clutch according to the present invention taken along the rotational axis of the clutch assembly with the clutch disengaged.

Referring to FIG. 1 of the drawings, a flywheel 1 is secured to a driving shaft 2 by means of bolts 3. A clutch cover 4 is secured to the flywheel 1 by means of bolts (not shown) in the well known conventional manner. A pressure plate 5 is mounted on the clutch cover 4 by means of straps 6 so as to be axially movable relative thereto and unitarily rotatable therewith. A diaphragm spring 7 is carried on the clutch cover 4 by rivets 9 so as to be rockable about the pivot rings 8 and 8' thereby pressing the pressure plate 5 toward flywheel 1. A clutch disc 10 disposed intermediate the flywheel 1 and the pressure plate 5 is thus engaged to transmit torque. A plurality of retracting springs 11, only one of which is shown in FIG. 1, are fixed to the pressure plate 5 at one end thereof and are resiliently engaged with the outer periphery of the diaphragm spring 7 at the other end thereof. The clutch construction thusfar described is commonly used in automotive vehicles. The diaphragm spring clutch according to the present invention is provided with means for initiating the smooth transmission of torque by interposing suitable cushioning means.

Figure 2:
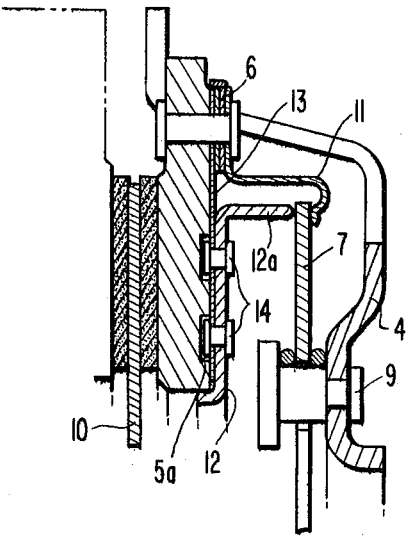
FIG. 2 is a partial sectional view similar to FIG. 1 showing the clutch engaged.
Figure 3:
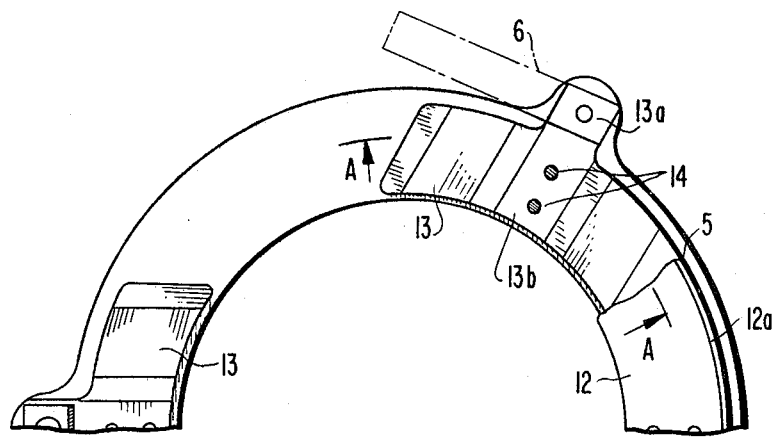
FIG. 3 is a partial view of the composite pressure plate as viewed in the axial direction with portions of the auxiliary part of the pressure plate broken away to show the interconnecting plate springs.
Figure 4:
FIG. 4 is a sectional view of a plate spring taken along the line A—A in FIG. 3.
Figure 5:
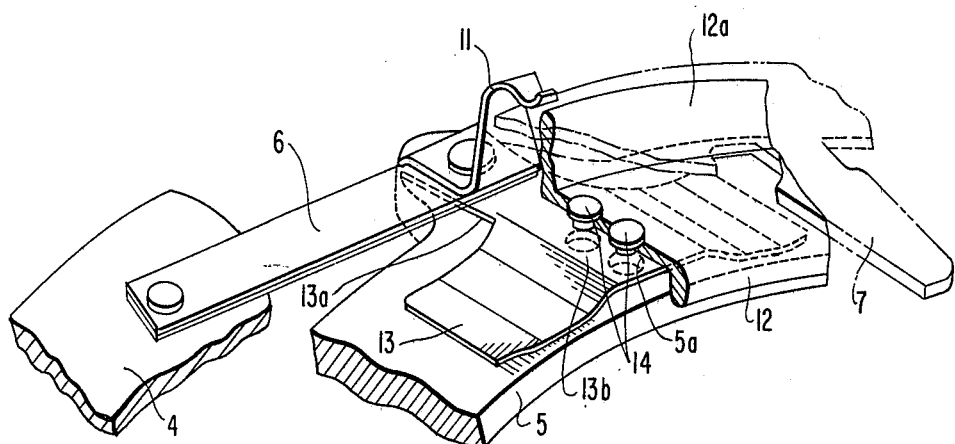
FIG. 5 is a partial perspective view of the composite pressure plate, a plate spring, a retracting spring, the diaphragm spring and supporting strap with selected parts sectioned and/or broken away for explanatory purposes.

According to the present invention a conventional clutch disc 10 is utilized which is not provided with any axial cushioning means. The pressure plate, however, is comprised of two plates disposed parallel to each other and to the clutch disc 10. One of the two plates which engages the clutch disc 10 will be referred to as the main plate 5 while the other plate remote from the clutch disc 10 will be referred to as the auxiliary plate 12. The main plate 5 is carried on the clutch cover 4 by means of a plurality of straps 6 connected to the main plate 5 at the outer periphery thereof. A plurality of plate springs 13 are disposed between the main plate 5 and the auxiliary plate 12 and operatively interconnect the main plate and the auxiliary plate to each other. The auxiliary plate 12 is provided at its outer periphery with an axially directed flange portion 12a which extends away from the clutch disc 10. The periphery of the diaphragm spring 7 is disposed between the flange portion 12a and the retracting springs 11. The pressing force of the diaphragm spring is transmitted to the flange portion 12a and then transmitted to the main plate 5 through plate springs 13 to provide for a cushioned and gradual engagement with the clutch disc 10. The plate springs 13 will be equally spaced about the periphery of the pressure plate and as best seen in FIGS. 3 and 5 each of the late springs 13 is of a substantially fan-shaped having a wavy cross-sectional shape in the circumferential direction as best seen in FIG. 4. The wave height corresponds to the desired flexibility of each plate 13 and the resilient force of the plate springs 13 is smaller than the resilient force of the diaphragm spring 7. Therefore, the plate springs 13 will normally separate the auxiliary plate 12 from the main plate 5 as seen in FIG. 1 when the main plate 5 is retracted from the clutch disc 10 and the plate springs 13 will be flatened when the clutch is engaged as seen in FIG. 2. Each plate spring 13 is provided at its radially outer portion with an ear 13a which is secured to the main plate 5 together with the strap 6 and the retracting spring 11 by means of a common rivet or bolt. The central portion 13b of each plate spring is disposed in engagement with the auxiliary plate 12 and is secured thereto by means of rivets 14. Thus, the plate springs 13 impart an axial force which will separate the auxiliary plate 12 from the main plate 5 when the main plate is disengaged from the clutch disc. The plate springs 13 simultaneously provide the support for the auxiliary plate 12. Blind bores 5a are provided on the main plate to receive the rivets 14 thereby enabling the wavy spring plates 13 to be completely flattened during clutch engagement.

Figure 6:
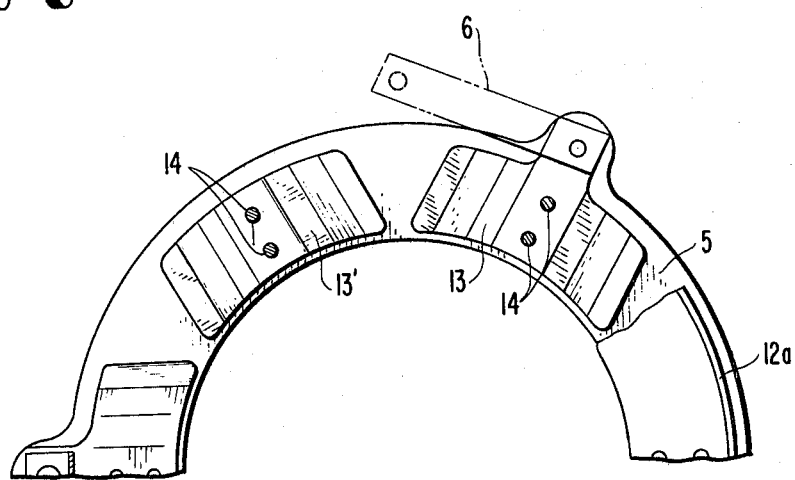
FIG. 6 is a view similar to FIG. 5 showing a modified plate spring arrangement.
Figure 7:
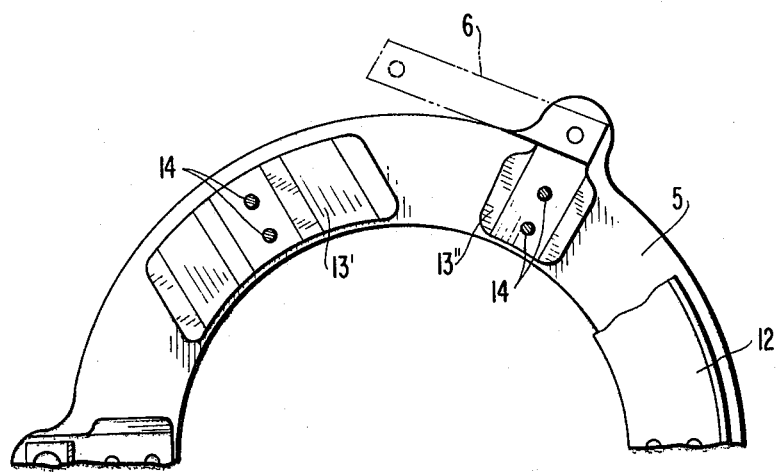
FIG. 7 is a view similar to FIG. 5 showing still another modified plate spring arrangement.

The number of spring plates required is determined by the clutch size, the desired transmitting force, the quality of the plate springs and the like. When the number of springs required is more than the number of straps 6 additional plate springs 13' can be secured to the auxiliary plate 12 intermediate the plate springs 13 as viewed in the embodiment of FIG. 6. The plate springs 13' are similar to the plate springs 13 but do not have the ear portion 13a. The plate spring 13' as shown in FIG. 6 has substantially the same circumferential extent as the plate spring 13 but the circumferential extent of the plate spring 13' could be larger or smaller as desired. Likewise, the interconnecting plate spring could be made smaller as evidenced by the plate spring 13" as viewed in the embodiment of FIG. 7.

In operation, the main plate 5 will be separated from the auxiliary plate 12 by a clearance d due to the plate springs 13 when the clutch is in the disengaged condition as shown in FIG. 1. When the clutch is engaged, the plate springs 13 will be axially deflected to gradually increase the pressing force of the main plate 5 applied to the clutch disc 10. When the engagement is completed, the plate springs 13 will be completely flattened as seen in FIG. 2 and the pressing force of the diaphragm spring 7 will act directly on the main plate 5 to increase the torque transmission. When the clutch is to be released, the main plate 5 is shifted axially away from the clutch disc 10 through the retracting spring 11 as the periphery of the diaphragm spring 7 is shifted to the right as viewed in FIG. 1. Simultaneously, the auxiliary plate 12 will be moved away from the main plate 5 by the operation of the plate springs 13.

As will be apparent from the previous description and in accordance with the present invention, the pressure plate comprises two parallel plates which cooperate in effecting the gradual transmission of torque during initial engagement under the operation of the diaphragm spring. Thus, the clutching operation is performed smoothly without any sliding action between the two parts of the pressure plate. In addition, the coaxial alignment of the main plate and the auxiliary plate with the rotational shaft is readily accomplished and since the auxiliary plate is of light weight construction any unbalanced condition is avoided and the auxiliary plate is inexpensive to manufacture.

While the invention has been particularly shown and described with reference to preferred embodiments thereof it will be understood by those in the art that the foregoing and other changes in form and details may be made therein without departing from the spirit and scope of the invention.

What is claimed is:

1. In a diaphragm spring operated clutch of the type having a clutch disc disposed intermediate a flywheel and movable pressure plate and a cover secured to said flywheel supporting a diaphragm spring and said movable pressure plate, the improvement comprising said pressure plate having a main annular part and an auxiliary annular part disposed parallel to each other and said clutch disc, a plurality of radially extending plate springs disposed intermediate and connected to said main part and said auxiliry part, said plate springs having a wavy cross-section in the circumferential direction with at least a central portion thereof engaging said auxiliary part and a lateral portion of each side thereof in engagement with said main part to separate said auxiliary part from said main part when the clutch is disengaged, means connecting said central portion of said plate springs to said auxiliary part, each of said plate springs having a radially outwardly projecting ear portion, a plurality of strap means connecting said main part of said pressure plate to said cover, a plurality of retracting springs disposed in operative engagement with said diaphragm spring and common attaching means for securing said strap means, said retracting springs and the ear portion of each of said plate springs to said main part of said pressure plate, said diaphragm spring being disposed in engagement with said auxiliary part for applying a clutch engaging force to said main part through said auxiliary part and said plate springs.

2. In a clutch as set forth in claim 1 wherein said auxiliary part of said pressure plate is provided with an axially extending flange directed away from said main part, the periphery of said diaphragm spring being disposed intermediate said flange and said retracting springs.

3. In a clutch as set forth in claim 1 further comprising additional plate spring means secured to said auxiliary part of said pressure plate intermediate said first mentioned plate springs, said additional plate springs having a wavy cross-sectional configuration in the circumferential direction

* * * * *